(12) United States Patent
Okuma et al.

(10) Patent No.: US 9,127,771 B2
(45) Date of Patent: *Sep. 8, 2015

(54) FLUID PRESSURE APPARATUS

(75) Inventors: Masahiro Okuma, Kitasoma-gun (JP);
Yasunaga Suzuki, Kitakatsushika-gun (JP)

(73) Assignee: SMC KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/107,285

(22) Filed: May 13, 2011

(65) Prior Publication Data

US 2011/0285095 A1 Nov. 24, 2011

(30) Foreign Application Priority Data

May 19, 2010 (JP) ................................. 2010-115079

(51) Int. Cl.
*F16J 15/18* (2006.01)
*F16J 15/32* (2006.01)
*F15B 15/14* (2006.01)
*F16J 15/56* (2006.01)

(52) U.S. Cl.
CPC ......... *F16J 15/3284* (2013.01); *F15B 15/1452* (2013.01); *F16J 15/56* (2013.01)

(58) Field of Classification Search
USPC .......................... 277/434, 436, 437, 438, 628
See application file for complete search history.

(56) References Cited

U.S. PATENT DOCUMENTS 2,068,859 A 1/1937 Jones et al.
2,349,170 A * 5/1944 Jackman ........................ 277/488
2,460,948 A 2/1949 Sander
2,765,204 A * 10/1956 Josephson ..................... 277/492
3,158,072 A 11/1964 Detrez
3,473,814 A * 10/1969 Bastow ......................... 277/562
3,582,094 A * 6/1971 Whittaker ..................... 277/584

(Continued)

FOREIGN PATENT DOCUMENTS

CN 2474811 Y 1/2002
CN 1380505 A 11/2002

(Continued)

OTHER PUBLICATIONS

Office Action issued Mar. 4, 2014 in Japanese Patent Application No. 2010-115079 (with partial English language translation).

(Continued)

*Primary Examiner* — Kristina Fulton
*Assistant Examiner* — Eugene G Byrd
(74) *Attorney, Agent, or Firm* — Oblon, McClelland, Maier & Neustadt, L.L.P.

(57) ABSTRACT

In a fluid pressure apparatus, a packing is constituted from an annular seal member made of an elastic rubber material, and support rings made of a material possessing low friction, which are mounted on an outer circumference of the seal member. The seal member includes, on an outer circumference thereof, a sealing projection, shoulder portions formed on both sides of the sealing projection, and concave grooves interposed between the shoulder portions and the sealing projection. The support rings include support surfaces on outer circumferences thereof, and engagement projections on inner circumferences thereof, such that by engagement of the projections in the concave grooves, the support rings are mounted on the seal member so as to surround outer circumferences of the shoulder portions.

8 Claims, 7 Drawing Sheets

(56) References Cited

U.S. PATENT DOCUMENTS

| | | | | |
|---|---|---|---|---|
| 3,583,712 A | * | 6/1971 | Domros et al. | 277/440 |
| 3,636,824 A | | 1/1972 | Clark | |
| 3,771,801 A | * | 11/1973 | Burke | 277/584 |
| 3,920,252 A | * | 11/1975 | Dechavanne | 277/437 |
| 4,059,280 A | | 11/1977 | Eastwood | |
| 4,079,951 A | | 3/1978 | Sievenpiper | |
| 4,177,837 A | | 12/1979 | Frank et al. | |
| 4,305,595 A | * | 12/1981 | Miyagishima et al. | 277/638 |
| 4,484,512 A | * | 11/1984 | Dechavanne | 92/243 |
| 4,496,161 A | | 1/1985 | Fischer | |
| 4,576,386 A | * | 3/1986 | Benson et al. | 277/584 |
| 4,577,874 A | * | 3/1986 | Zitting | 277/584 |
| 4,614,348 A | | 9/1986 | Fournier | |
| 5,014,603 A | * | 5/1991 | Navarette et al. | 92/165 R |
| 5,385,081 A | * | 1/1995 | Sneddon | 92/192 |
| 5,390,939 A | * | 2/1995 | Terauchi et al. | 277/650 |
| 5,524,905 A | * | 6/1996 | Thoman et al. | 277/572 |
| 5,879,010 A | * | 3/1999 | Nilkanth et al. | 277/545 |
| 6,173,964 B1 | * | 1/2001 | Bell et al. | 277/584 |
| RE42,654 E | | 8/2011 | Zitting | 277/435 |
| 8,246,055 B2 | | 8/2012 | Asplund et al. | 277/609 |
| 8,739,684 B2 | * | 6/2014 | Okuma et al. | 92/165 R |
| 2002/0153665 A1 | | 10/2002 | Borstel et al. | |
| 2008/0019851 A1 | | 1/2008 | Hopkins et al. | |
| 2011/0283880 A1 | * | 11/2011 | Okuma et al. | 92/165 R |

FOREIGN PATENT DOCUMENTS

| | | |
|---|---|---|
| CN | 101535693 A | 9/2009 |
| CN | 201416636 Y | 3/2010 |
| EP | 0048707 A2 | 3/1982 |
| EP | 0219689 A2 | 4/1987 |
| GB | 1274999 | 5/1972 |
| GB | 1316841 | 5/1973 |
| GB | 1512181 | 5/1978 |
| GB | 2077368 A | 12/1981 |
| JP | 46-3861 | 11/1971 |
| JP | 53-65553 | 6/1978 |
| JP | 60-121560 U | 8/1985 |
| JP | 61-32862 U | 2/1986 |
| JP | 63-16925 Y2 | 5/1988 |
| JP | 5-505012 A | 7/1993 |
| JP | 8-326914 A | 12/1996 |
| JP | 9-72310 | 3/1997 |
| JP | 2000-74009 A | 3/2000 |
| JP | 2003-120602 | 4/2003 |

OTHER PUBLICATIONS

Combined Chinese Office Action and Search Report issued Jul. 23, 2014, in Chinese Patent Application No. 201110145285.4 with English translation.

Combined Chinese Office Action and Search Report issued Jul. 25, 2014, in Chinese Patent Application No. 201110145289.2 with English translation.

U.S. Office Action dated Apr. 8, 2014 issued in co-pending U.S. Appl. No. 13/107,312.

Office Action issued Jan. 7, 2014 in Japanese Patent Application No. 2010-115074 with partial English language translation.

Office Action issued Jan. 7, 2014 in Japanese Patent Application No. 2010-115077 with partial English language translation.

Combined Chinese Office Action and Search Report issued Jul. 3, 2014 in Patent Application No. 201110141493.7 (with English language translation).

Office Action mailed Sep. 24, 2014 in co-pending U.S. Appl. No. 13/107,312 Examiner Lopez, Frank D.

* cited by examiner

FLUID PRESSURE APPARATUS

CROSS-REFERENCE TO RELATED APPLICATION

This application is based upon and claims the benefit of priority from Japanese Patent Application No. 2010-115079 filed on May 19, 2010, of which the contents are incorporated herein by reference.

BACKGROUND OF THE INVENTION

1. Field of the Invention

The present invention relates to a fluid pressure apparatus of a fluid pressure cylinder or a fluid changeover valve or the like, and more specifically, concerns a fluid pressure device in which a packing is installed. Such a packing constitutes an improvement to a partitioning member comprising a piston or a spool or the like, which moves in the interior of a slide hole defined in a housing.

2. Description of the Related Art

A fluid pressure cylinder generally includes a piston that moves in an axial direction along the interior of a slide hole formed in a housing. A seal member made of an elastic rubber material is installed in an installation groove, which is formed on the outer circumference of the piston, such that through the seal member, sealing is effected between the inner circumference of the slide hole and the outer circumference of the piston. Further, together with the seal member, a wear ring is provided on the piston. In the case that a transverse load acts in a direction tending to cause misalignment between the axis of the slide hole and the axis of the piston, misalignment of the piston axis is suppressed by the wear ring and the packing is prevented from being pressed against the inner surface of the slide hole too hard to be extremely crushed, while at the same time, the outer circumference of the piston is prevented by the wear ring from coming into contact with the inner circumference of the slide hole. The wear ring is formed in an annular shape, including a cut line in a portion thereof, from a material (e.g., a synthetic resin) having a hardness greater than that of the packing and which is superior in terms of slidability. By means of the cut line, the ring can be opened and installed on the outer circumference of the piston.

As an example of a fluid pressure apparatus having such a wear ring, in Japanese Laid-Open Patent Publication No. 09-072310, there is disclosed a device in which a seal member (o-ring) and a backup ring (wear ring) are installed in parallel in an installation groove on the outer circumference of a piston. Further, in Japanese Laid-Open Patent Publication No. 2003-120602, there is disclosed a device in which a seal member (D ring), which is equipped with a sealing projection on the outer circumference thereof, is installed in an installation groove on the outer circumference of a piston, and together therewith, a backup ring (wear ring) is installed thereon so as to surround the outer circumference of shoulder portions on both sides of the sealing projection of the seal member.

However, in the devices disclosed in Japanese Laid-Open Patent Publication No. 09-072310 and Japanese Laid-Open Patent Publication No. 2003-120602, structures are provided in which wear rings made up from a synthetic resin or a metallic material or the like, which are hard and wherein the thickness thereof is large in the radial direction, are fitted into installation grooves together with the seal members. Therefore, due to the rigidity of such wear rings, installation and mounting of the wear rings is comparatively difficult. In this case, because only a small portion of the outer circumferential side of the wear ring projects outwardly from the installation groove, and because it is necessary for the inner circumferential side of the wear ring, which makes up the major portion thereof, to be engaged within the installation grove by being fitted into the installation groove, the thickness of the wear ring in the radial direction cannot easily be reduced or made thin.

SUMMARY OF THE INVENTION

An object of the present invention is to provide a fluid pressure apparatus in which support rings having the function of a wear ring can be installed together with a seal member on the outer circumference of a partitioning member, without requiring the support rings to be fitted into the installation groove in which the seal member is installed. As a result of such a structure, mounting of the support rings can be simplified.

To resolve the problems mentioned above, the invention of the present application is characterized by a fluid pressure apparatus comprising a slide hole formed in a housing, and a partitioning member that moves in an axial direction along an interior of the slide hole, wherein a packing installation groove is formed on an outer circumference of the partitioning member, and an annular packing is installed inside the packing installation groove. The packing is formed by an annular seal member made of an elastic rubber material, and support rings made of a material possessing low friction, which are mounted on an outer circumference of the seal member. The seal member includes, on the outer circumference thereof, a sealing projection that contacts an inner surface of the slide hole, shoulder portions formed on both sides of the sealing projection and which project outwardly from the packing installation groove, and concave grooves interposed between the shoulder portions and the sealing projection. The support rings include support surfaces, which are parallel on outer circumferences thereof with an axial direction of the partitioning member, and engagement projections on inner circumferences thereof, such that by engagement of the projections in the concave grooves, the support rings are mounted on the seal member so as to surround outer circumferences of the shoulder portions.

In the fluid pressure apparatus of the present invention, diameters of the support surfaces are formed to be smaller than an inner diameter of the slide hole, such that when a transverse load does not act on the partitioning member, the support surfaces occupy a position out of contact with the inner surface of the slide hole, and when a transverse load acts on the partitioning member, the support surfaces come into contact with the inner surface of the slide hole, whereby the transverse load is borne by the shoulder portions through the support rings, and consequently the outer circumferential surface of the partitioning member is prevented from coming into contact with the inner surface of the slide hole.

In the fluid pressure apparatus of the present invention, the support rings in their entirety are disposed at all times outside of the packing installation groove, when the transverse load does not act as well as when the transverse load acts on the partitioning member.

In the fluid pressure apparatus of the present invention, a cross sectional area of the seal member is greater than a cross sectional area of the packing installation groove, such that the shoulder portions occupy positions that project outwardly from the packing installation groove at all times.

In the fluid pressure apparatus of the present invention, an inner circumferential projection for sealing is formed on the inner circumference of the seal member in elastic contact with a groove bottom of the packing installation groove.

According to the present invention, as a result of the projections, which are formed on inner circumferences of the support rings, engaging with the recess grooves on the outer circumference of the seal member, the support rings are mounted on the seal member surrounding the outer circumferences of the shoulder portions. Therefore, the support rings can be installed together with the seal member on the outer circumference of the partitioning member in a state of engagement with the seal member, without the support rings being fitted into the interior of the packing installation groove. Consequently, mounting of the support rings is simplified. Additionally, because the support rings are mounted on the seal member between the shoulder portions, which project outwardly from the packing installation groove, and the inner circumference of the slide hole, the thickness in the radial direction of the support rings can be reduced (made thinner), and thus manufacturing and handling of the support rings are facilitated.

The above and other objects features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENTS

Figure 1:
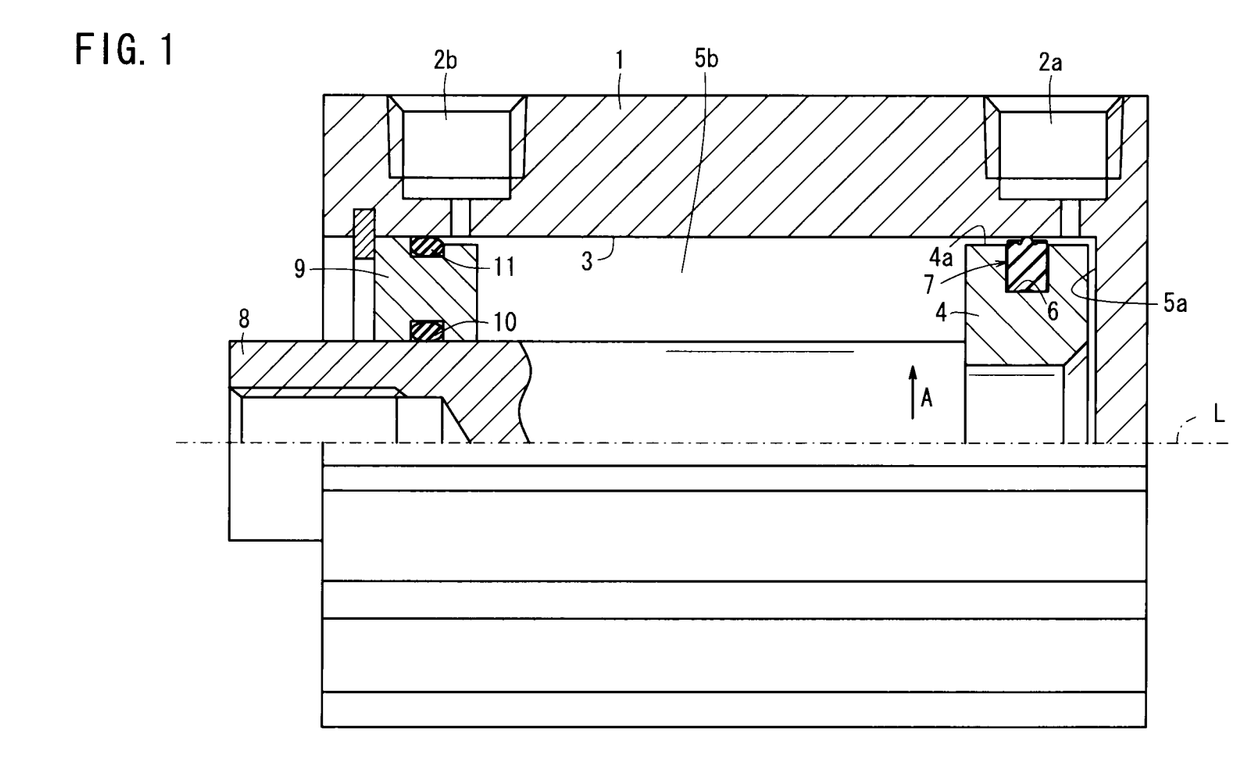
FIG. 1 is a partial cross sectional view of a fluid pressure cylinder, which forms an example of a fluid pressure apparatus according to the present invention.

FIG. 1 shows a fluid pressure cylinder, which forms an example of a fluid pressure apparatus according to the present invention. The fluid pressure cylinder includes a slide hole 3 that communicates between a pair of ports 2a, 2b, the slide hole 3 forming the interior of a housing 1 made from a metallic material such as an aluminum alloy or the like, which is equipped with the pair of ports 2a, 2b. In the interior of the slide hole 3, there is provided a piston (partitioning member) 4 similarly made from a metallic material such as an aluminum alloy or the like, and which forms a partitioning member that partitions the interior of the slide hole 3 into two respective pressure chambers 5a, 5b. A packing installation groove 6 is formed on the outer circumference of the piston 4, with a ring-shaped or annular packing 7 being installed in the packing installation groove 6. By means of the packing 7, an interface between the outer circumferential surface 4a of the piston 4 and the inner circumferential surface 3a of the slide hole 3 is sealed. Further, a base end portion of a piston rod 8 is connected to the piston 4, whereas a distal end portion of the piston rod 8 penetrates through a rod cover 9 that blocks one end of the slide hole 3 and extends externally outside of the slide hole 3.

As shown in FIG. 1, a seal member 10, which forms a seal between the inner circumferential surface of the rod cover 9 and the outer circumferential surface of the piston rod 8, is installed on an inner circumference of the rod cover 9. Further, another seal member 11, which forms a seal between the outer circumferential surface of the rod cover 9 and the inner circumferential surface of the slide hole 3, is installed on the outer circumference of the rod cover 9.

Additionally, by supplying and discharging a pressure fluid such as compressed air or the like alternately to and from interiors of the two pressure chambers 5a, 5b through the two ports 2a, 2b, the piston 4 is made to undergo reciprocating movements so as to advance and retract the piston rod 8.

Figure 2:
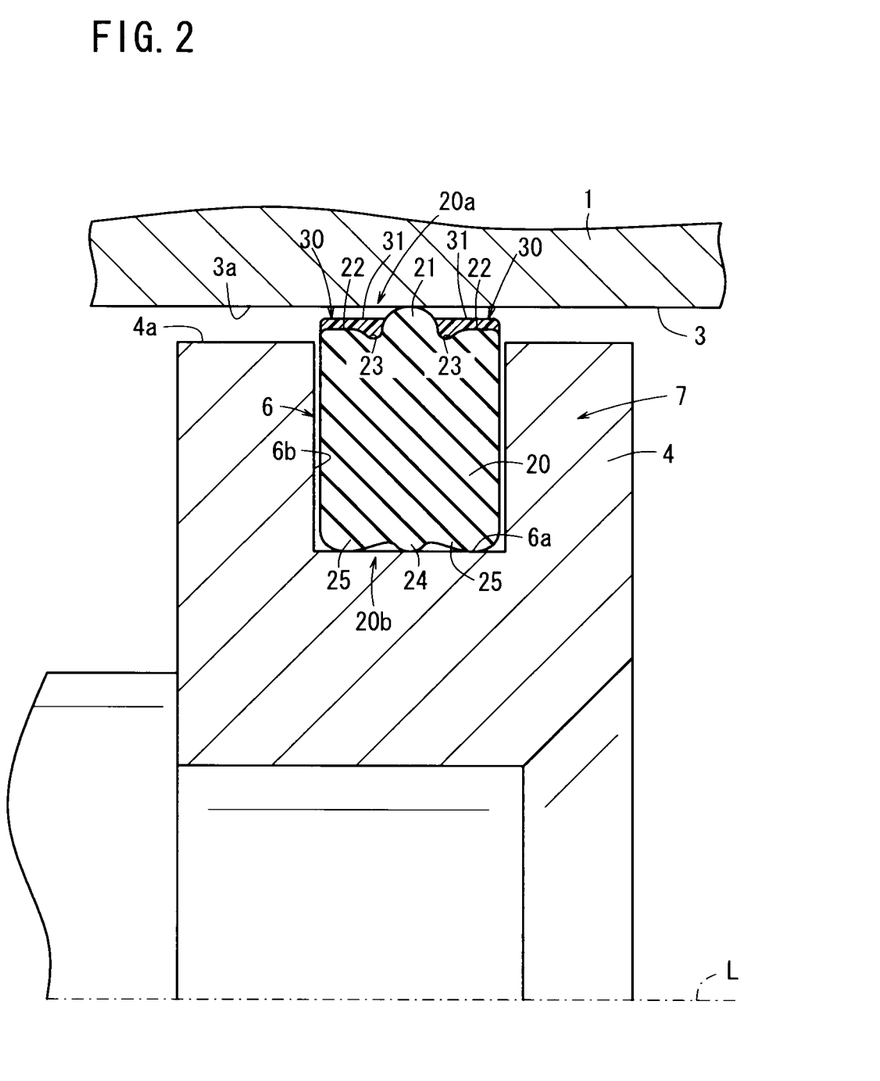
FIG. 2 is an enlarged cross sectional view of a main part shown in FIG. 1.
Figure 3:
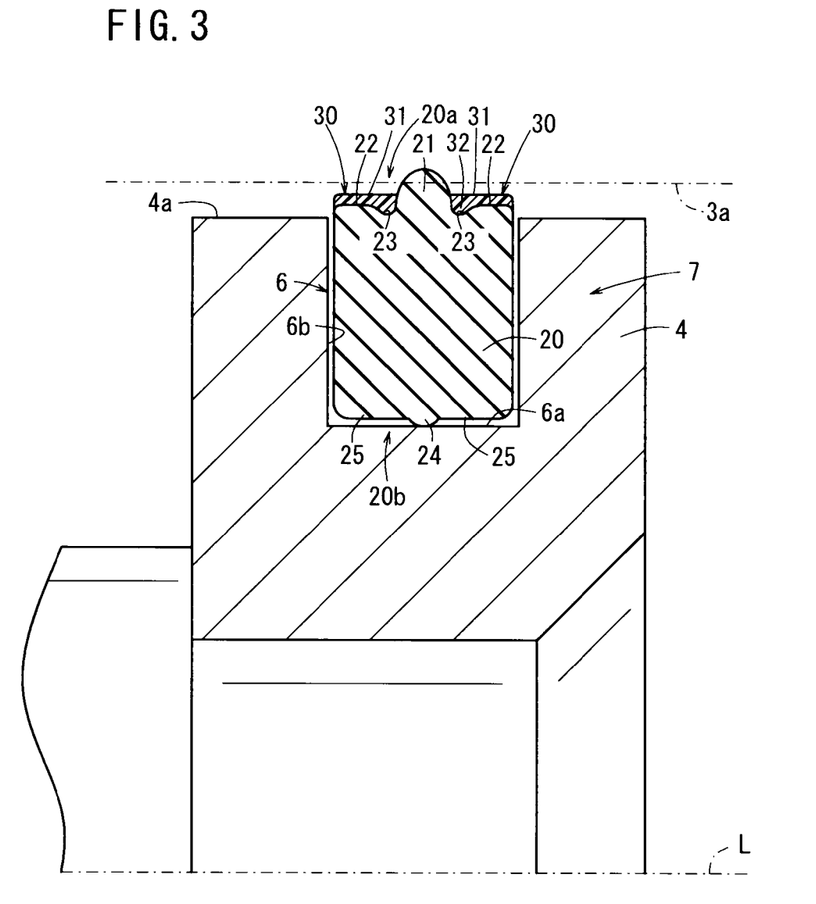
FIG. 3 is a cross sectional view of a main part, in a state in which the piston is not inserted inside the slide hole.
Figure 4:
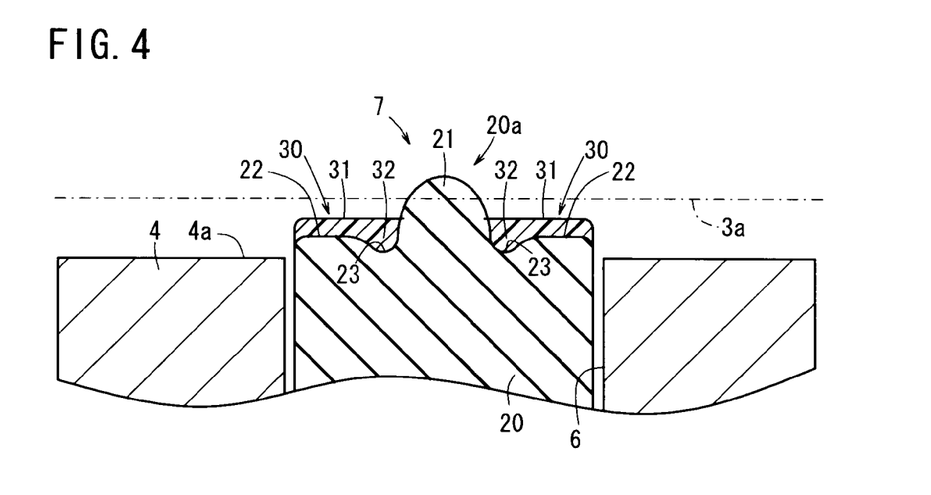
FIG. 4 is an enlarged cross sectional view illustrating a principal feature shown in FIG. 3.

The packing installation groove 6 of the piston 4 and the packing 7 are formed as shown in FIGS. 2 through 4.

FIG. 3 shows a condition in which the packing 7 is installed inside the packing installation groove 6, yet wherein the piston 4 is not inserted into the interior of the slide hole 3, and hence, the packing 7 itself is not deformed. FIG. 2 shows a state in which, by insertion of the piston 4 into the interior of the slide hole 3, the packing 7 comes into abutment with the inner circumferential surface 3a of the slide hole 3 and with the groove bottom 6a of the packing installation groove 6, and is compressed in the radial direction, and wherein, although the breadth of the packing 7 is deformed in a direction in which the packing tends to expand, a transverse load is not shown as acting on the packing 7. At this time, the axis of the piston 4 and the axis L of the slide hole 3 coincide with each other. Accordingly, in the following explanations, the reference character "L" also is appended to the axis L of the piston 4.

The aforementioned transverse load is defined as a sideways force that acts on the piston 4 through the piston rod 8, from a member connected to the distal end of the piston rod 8 on which work is performed, whereby the force tends to shift and incline the axis of the piston 4 away from the axis L of the slide hole 3.

The packing installation groove 6 is a groove surrounded on three sides by left and right side walls 6b and the groove bottom 6a. The left and right side walls 6b make up flat surfaces, respectively, perpendicular to the axis L of the piston 4 and which are arranged mutually in parallel. The groove bottom 6a makes up a surface, which is aligned parallel to the direction of the axis L of the piston 4. Accordingly, the packing installation groove 6 overall has a uniform groove width and a uniform depth.

Further, the packing 7 is formed by an annular seal member 20 made from an elastic rubber material, and by two support rings 30, which are mounted on the outer circumference of the seal member 20.

The seal member 20 has an outer circumference 20a and an inner circumference 20b, as well as left and right side walls, which are flat and arranged mutually in parallel. The outer circumference 20a of the seal member 20 is formed with a sealing projection 21, the cross sectional shape of which is semicircular or of a similar shape, and which at all times is in contact with the inner circumferential surface 3a of the slide hole 3, two shoulder portions 22 positioned on both sides of the sealing projection 21 and which project outwardly from the packing installation groove 6, and concave grooves, which are U-shaped in cross section, interposed between the shoulder portions 22 and the sealing projection 21.

The sealing projection 21 is formed at a substantially central position on the outer circumference of the seal member 20. Further, the shoulder portions 22 make up surfaces, which are parallel to the direction of the axis L of the piston 4, and the diameters of the two shoulder portions 22 are substantially the same. Stated otherwise, a distance from the axis L of the piston 4 to one of the shoulder portions 22 and the distance from the axis L to the other of the shoulder portions 22 are mutually the same. In addition, the diameter of the shoulder portions 22 is formed to be greater than the outer diameter of the piston 4 and to be less than the inner diameter of the slide hole 3. Together therewith, by forming the cross sectional area of the seal member 20 to be greater than the cross sectional area of the packing installation groove 6, the shoulder portions 22 at all times occupy positions between the outer circumferential surface 4a of the piston 4 and the inner circumferential surface 3a of the slide hole 3.

Further, the support rings 30 are made from a synthetic resin material or a metallic material or the like such as, for example, polytetrafluoroethylene (PTFE), having a low friction and abrasion resistant property. The support rings 30 have support surfaces 31, which are parallel on the outer circumference thereof with the direction of the axis L of the piston 4, and engagement projections 32 having U-shaped cross sections on the inner circumference thereof. By engagement of the projections 32 within the concave grooves 23, the support rings 30 are mounted on the seal member 20 so as to surround outer circumferences of the shoulder portions 22.

By forming the support rings 30 such that the diameter of the support surfaces 31 is less than the inner diameter of the slide hole 3, when a transverse load does not act on the piston 4, the support surfaces 31 occupy positions out of contact with the inner circumferential surface 3a of the slide hole 3, and when a transverse load acts on the piston 4, the support surfaces 31 are brought into contact partially with the inner circumferential surface 3a of the slide hole 3. Further, the support rings 30 in their entirety are mounted on the seal member 20 so as to remain outside of the packing installation groove 6 at all times, when a transverse load does not act as well as when a transverse load acts on the piston 4.

Although the support rings 30 can be formed integrally with the seal member 20 at a time of formation of the seal member 20, the support rings 30 may also be mounted on the seal member 20 at a time when the packing 7 is mounted on the piston 4 and after the seal member 20 has been installed inside the packing installation groove 6. In this case, cut lines are made into portions of the support rings 30, wherein the support rings 30 are mounted on the seal member 20 in a state in which the support rings 30 are opened at the location of the cut lines.

On the inner circumference of the seal member 20, an inner circumferential projection 24 for sealing, which is semicircular in cross section, is formed in elastic contact with the groove bottom 6a of the packing installation groove 6. The inner circumferential projection 24 is disposed at a position along the direction of the axis L of the piston 4 equivalent to that of the sealing projection 21, and more specifically, is disposed in a center position on the inner circumference of the seal member 20. The width and height of the inner circumferential projection 24 are smaller than those of the sealing projection 21. Further, as shown in FIG. 2, on both sides of the inner circumferential projection 24 on the inner circumference of the seal member 20, abutment surfaces 25 are provided, portions of which come into abutment with the groove bottom 6a when the inner circumferential projection 24 is compressed and pressed toward the groove bottom 6a of the packing installation groove 6. As shown in FIG. 3, in a state in which the piston 4 is not installed inside the slide hole 3, the abutment surfaces 25 are surfaces parallel with the direction of the axis L of the piston 4, and at this time, the diameters of the two abutment surfaces 25 on both sides of the inner circumferential projection 24 are mutually equivalent.

The inner circumferential projection 24 can also be disposed at another position, which is different from the position of the sealing projection 21 in the direction of the axis of the piston 4.

In the present embodiment, as shown in FIG. 2, in a normal condition in which a transverse load does not act on the piston 4, the sealing projection 21 on the outer circumference of the seal member 20 is in abutment with and compressed uniformly over the entire circumference of the seal member 20 against the inner surface of the slide hole 3 around the full circumference thereof. Further, the support surfaces 31 on the outer surface of the support rings 30, which are mounted on both sides of the sealing projection 21, occupy positions that project outwardly from the packing installation groove 6, and the support surfaces 31 are maintained in a state out of contact with respect to the inner circumferential surface 3a of the slide hole 3.

Figure 5:
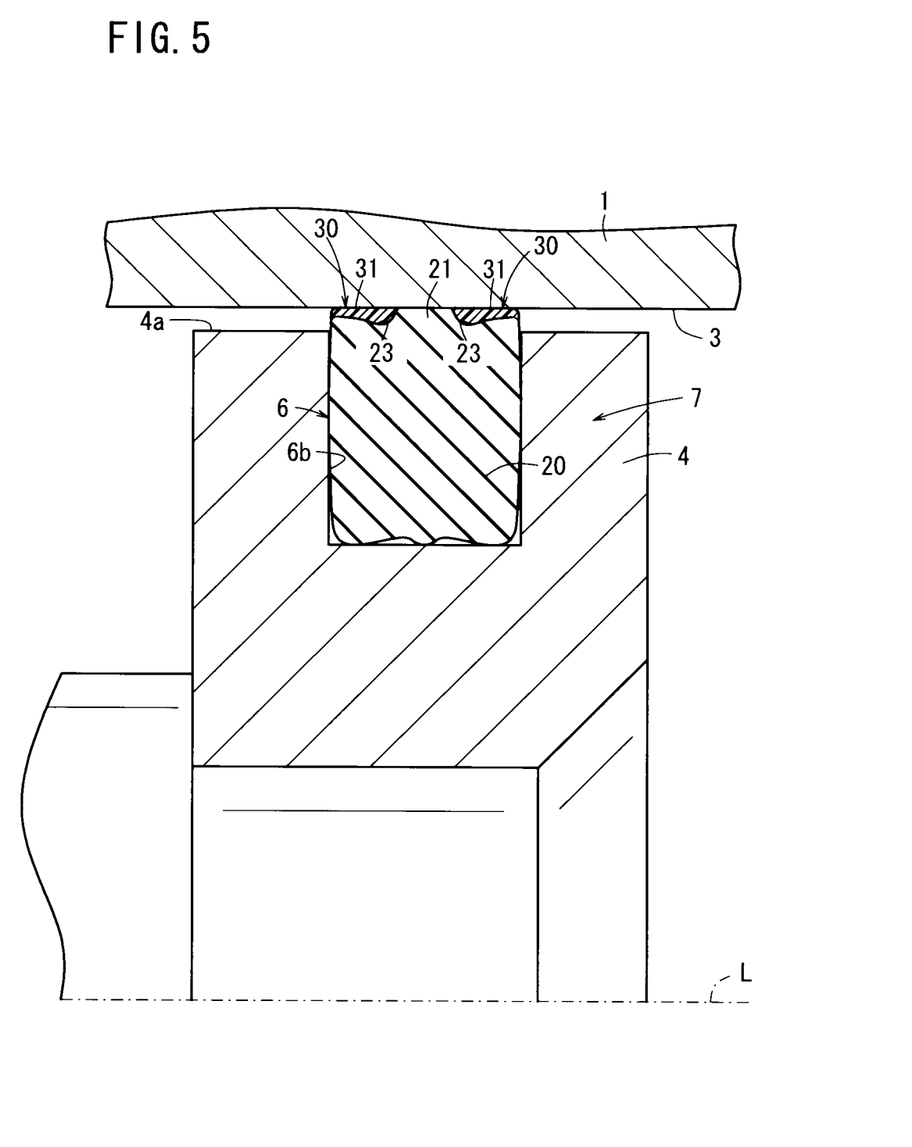
FIG. 5 is a cross sectional view of a main part, showing a packing and locations proximate thereto when a transverse load acts on the piston.

From this condition, as shown in FIG. 5, when a transverse load acts on the piston rod 8 such that the piston 4 is pressed strongly in a sideways direction of the slide hole 3, the sealing projection 21 becomes further compressed. However, the support surfaces 31 of the support rings 30 abut against the inner surface of the slide hole 3 and the transverse load is borne by the shoulder portions 22 of the seal member 20 through the support rings 30, and as a result thereof, the outer surface of the piston 4 is prevented from coming into abutment against the inner surface of the slide hole 3, whereby damage caused by mutual contact between such metallic members is reliably prevented. Further, because the support rings 30 have a low frictional characteristic, frictional resistance with the inner surface of the slide hole 3 is small, and therefore the piston 4 continues to operate smoothly and stably.

Figure 6:
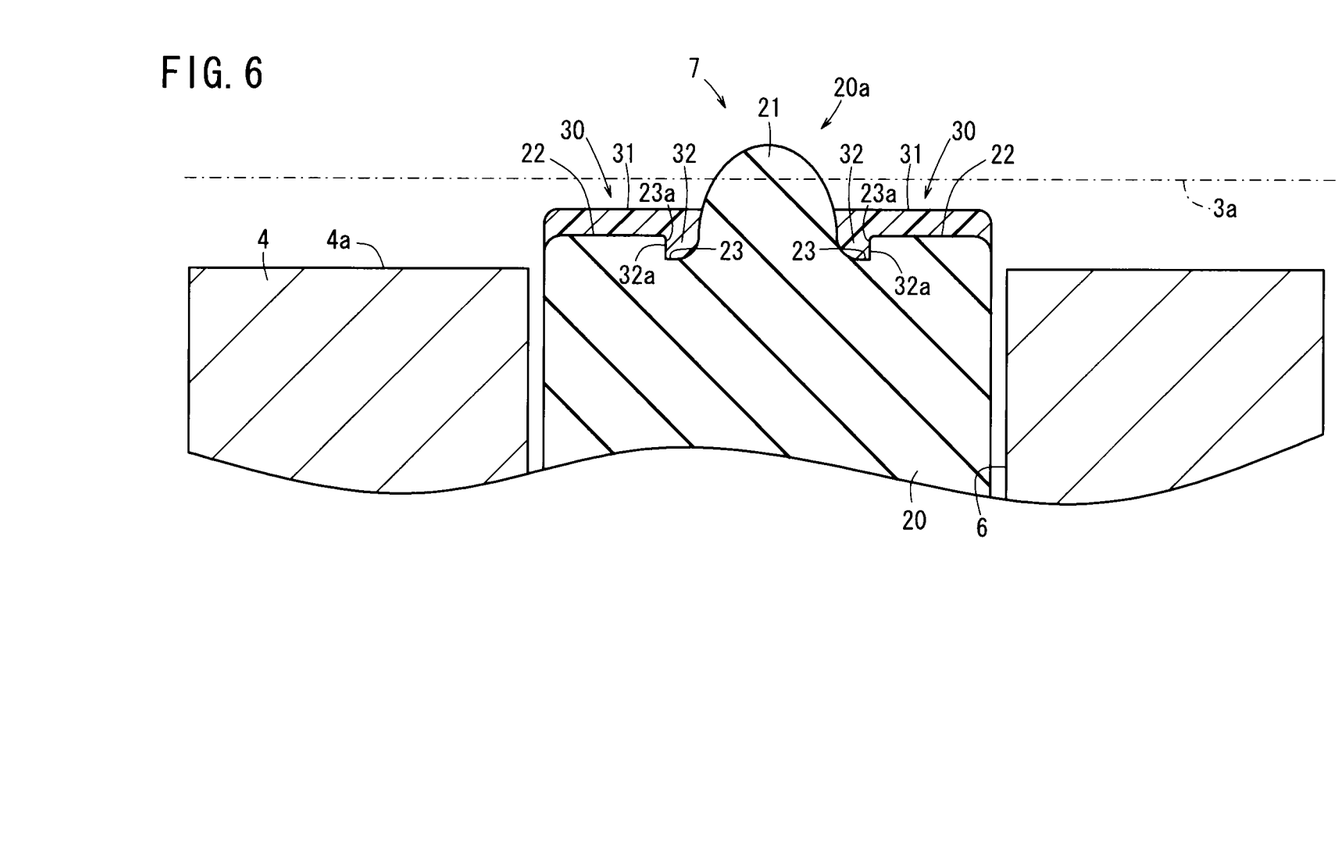
FIG. 6 is an enlarged cross sectional view of a main part, showing a second embodiment of the present invention.

With the present embodiment, although the concave grooves 23 on the outer circumference of the seal member 20 and the projections 32 on the inner circumference of the support rings 30 are formed to be U-shaped in cross section, the concave grooves 23 and the projections 32 can be formed in other shapes. For example, as shown in FIG. 6, groove surfaces 23a of the convex grooves 23 proximate to the shoulder portions 22, and side surfaces 32a of the projections 32 that correspond to the groove surfaces 23a can be formed as flat surfaces perpendicular to the axis L of the seal member 20, whereby the support rings 30 can engage reliably with respect to the seal member 20. Alternatively, left and right groove surfaces of the concave grooves 23 can be formed as mutually parallel flat surfaces, and the bottom surface thereof may be arranged parallel with the axis L of the piston 4. The cross sectional shape of the projections 32 can be formed with shapes similar to the groove shape of the concave grooves 23.

Figure 7:
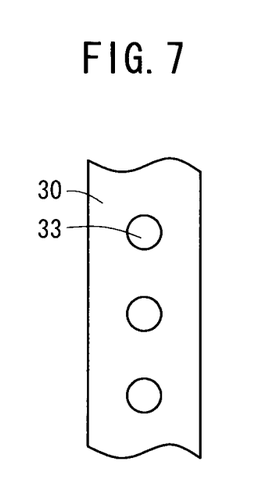
FIG. 7 is a partial plan view of a support ring.

Further, as shown in FIG. 7, a plurality of holes 33 can be formed at equal intervals in the support rings 30. Such holes 33 possess a function to retain grease therein. Therefore, by retaining grease in the interiors thereof, suitable slidability between the support surfaces 31 and the inner surface of the slide hole 3 can be maintained over a long period.

In the foregoing description, a fluid pressure cylinder has been shown as one example of a fluid pressure apparatus. However, the fluid pressure apparatus may also comprise a fluid changeover valve, in which a fluid passage is switched by means of a spool that slides along the interior of a slide hole formed in a housing. In this case, the spool forms the partitioning member.

Although certain preferred embodiments of the present invention have been shown and described in detail, it should be understood that various changes and modifications may be made therein without departing from the scope of the appended claims.

What is claimed is:

1. A fluid pressure apparatus comprising a slide hole formed in a housing, and a partitioning member that moves in an axial direction along a radial interior of the slide hole, wherein a packing installation groove extends radially inward into the partitioning member from a radially outer edge of the packing installation groove located at a radially outer circumference of the partitioning member and an annular packing is installed inside the packing installation groove, wherein:

the packing is formed by an annular seal member made of an elastic rubber material, and support rings made of a material possessing low friction, which are mounted on a radially outer circumference of the seal member;

the seal member includes, on the radially outer circumference thereof, a sealing projection that contacts a radially inner surface of the slide hole, shoulder portions formed on both sides of the sealing projection in the axial direction, wherein the shoulder portions each defines a surface extending in the axial direction and wherein the axially extending surface of each shoulder portion is provided at a location that is radially outward of the radially outer edge of the packing installation groove, and concave grooves interposed between the shoulder portions and the sealing projection in the axial direction, wherein the concave grooves define concavities that are depressed radially with respect to the axially extending surfaces of the shoulder portions; and the support rings include support surfaces, which are parallel on outer circumferences thereof with the axial direction, and engagement projections on inner circumferences thereof, such that by engagement of the projections in the concave grooves, the support rings are mounted on the seal member at a location radially outwardly from the packing installation groove so as to surround the axially extending surfaces of the shoulder portions, wherein a diameter of the support surfaces is formed to be smaller than an inner diameter of the slide hole, such that the support surfaces may occupy a position out of contact with the inner surface of the slide hole, and wherein the sealing projection projects outwardly from the support surfaces of the support rings, and the sealing projection is elastically deformable such that the sealing projection and the support surfaces are able to contact the inner surface of the slide hole together.

2. A fluid pressure apparatus comprising a slide hole formed in a housing, and a partitioning member that moves in an axial direction along a radial interior of the slide hole, wherein a packing installation groove extends radially inward into the partitioning member from a radially outer edge of the packing installation groove located at a radially outer circumference of the partitioning member and an annular packing is installed inside the packing installation groove, wherein:

the packing is formed by an annular seal member made of an elastic rubber material, and support rings made of a material possessing low friction, which are mounted on a radially outer circumference of the seal member;

the seal member includes, on the radially outer circumference thereof, a sealing projection that contacts a radially inner surface of the slide hole, shoulder portions formed on both sides of the sealing projection and which project radially outwardly from the packing installation groove in the axial direction, wherein the shoulder portions each defines a surface extending in the axial direction, and concave grooves interposed between the shoulder portions and the sealing projection in the axial direction, wherein the concave grooves define concavities that are depressed radially with respect to the axially extending surfaces of the shoulder portions; and the support rings include support surfaces, which are parallel on radially outer circumferences thereof with the axial direction, and engagement projections on radially inner circumferences thereof, such that by engagement of the projections in the concave grooves, the support rings are mounted on the seal member at a location radially outwardly of the radially outer edge of the packing installation groove so as to surround the axially extending surfaces of the shoulder portions, wherein the support rings in their entirety are disposed outside of the radially outer edge of the packing installation groove, and wherein the sealing projection projects radially outwardly from the support surfaces of the support rings, and the sealing projection is elastically deformable such that the sealing projection and the support surfaces are able to contact the radially inner surface of the slide hole together.

3. The fluid pressure apparatus according to claim 1, wherein a cross sectional area of the seal member is greater than a cross sectional area of the packing installation groove, such that the shoulder portions occupy positions that project radially outwardly from the packing installation groove at all times.

4. The fluid pressure apparatus according to claim 1, wherein a radially inner circumferential projection for sealing is formed on the radially inner circumference of the seal member in elastic contact with a groove bottom of the packing installation groove.

5. The fluid pressure apparatus according to claim 2, wherein a cross sectional area of the seal member is greater than a cross sectional area of the packing installation groove, such that the shoulder portions occupy positions that project radially outwardly from the packing installation groove at all times.

6. The fluid pressure apparatus according to claim 2, wherein an inner circumferential projection for sealing is formed on the radially inner circumference of the seal member in elastic contact with a groove bottom of the packing installation groove.

7. The fluid pressure apparatus according to claim 1, wherein the concavities are depressed in a radial inward direction.

8. The fluid pressure apparatus according to claim 2, wherein the concavities are depressed in a radial inward direction.

* * * * *